United States Patent

Courtney-Pratt

[15] 3,665,237

[45] May 23, 1972

[54] IMAGE-RETAINING PANEL IMPERVIOUS TO AMBIENT LIGHT

[72] Inventor: Jeofry Stuart Courtney-Pratt, Locust, N.J.

[73] Assignee: Bell Telephone Laboratories, Incorporated, Murray Hill, Berkeley Heights, N.J.

[22] Filed: Dec. 21, 1970

[21] Appl. No.: 100,168

[52] U.S. Cl. ..........................313/108 A, 313/92 LF, 313/94, 313/111, 313/117, 315/169 TV

[51] Int. Cl. ..........................H01j 1/70

[58] Field of Search ..........................313/92 LF, 108 A, 91, 117, 313/94, 111; 178/7.85; 315/169 TV

[56] References Cited

UNITED STATES PATENTS

| | | | |
|---|---|---|---|
| 2,189,340 | 2/1940 | Donal, Jr. | 313/91 X |
| 3,001,447 | 9/1961 | Ploke | 313/91 X |
| 3,141,106 | 7/1964 | Kapany | 313/92 LF |
| 3,350,596 | 10/1967 | Burns | 313/108 A |

*Primary Examiner*—Roy Lake
*Assistant Examiner*—Palmer C. Demeo
*Attorney*—R. J. Guenther and Edwin B. Cave

[57] ABSTRACT

An image-retaining panel receives a momentarily projected image, and retains a replica of that image for extended periods irrespective of local lighting. The panel consists of a pair of electroluminescent slabs electrically connected by an opaque layer that conducts only laterally. The viewing image formed on the outer electroluminescent slab does not affect the photoconductivity of the medium which drives the inner electroluminescent slab. Hence, ambient light falling on the outer slab does not affect the image.

5 Claims, 4 Drawing Figures

PATENTED MAY 23 1972 3,665,237

INVENTOR
J. S. COURTNEY-PRATT
BY Charles E. Graves
ATTORNEY

IMAGE-RETAINING PANEL IMPERVIOUS TO AMBIENT LIGHT

FIELD OF THE INVENTION

This invention relates to imaging systems in general, and particularly concerns an image-retaining panel useful as a high-resolution adjunct to a video receiver.

BACKGROUND OF THE INVENTION

The use of a video screen to display highly detailed material, such as fine printing or still graphic data, represents an important added service in video communications. An example of this service involves video telephone systems which typically operate on a bandwidth of 1 MHz. For high resolution, the latter dictates a slow scan of about 4 seconds per complete image. However, the cathode ray tube (CRT) display used currently in video telephony generates an unacceptable level of flicker in the slow scan mode.

One proposed solution involves the use of image-retaining panels. These panels receive the image projected from the CRT scanning beam onto a photoconductive panel associated with an electroluminescent plate. A suitable high potential across this assembly enables the projected image to linger on the plate. However, ambient light can affect the luminescing of the plate. Protective light screens for such panels are therefore required, although even these do not eliminate the problem and moreover, are costly, bulky and unattractive.

Accordingly, one object of the invention is to retain a replica of a projected image well after projection is completed, in the presence of any degree of ambient light, direct or indirect.

A further inventive object is to extend the use of a video telephone screen to high resolution graphics.

SUMMARY OF THE INVENTION

These and other objects are achieved pursuant to the invention, with a pair of electroluminescent slabs optically isolated but electrically connected by an intervening opaque layer which conducts electrically only in the lateral direction, that is, through its face-to-face dimension.

The first or inner slab is adjacent on its input side to a photoconductive medium, which conventionally receives a projected image on its outer surface. A potential applied between the photoconductive medium and the outer electroluminescent slab causes the inner slab to luminesce more brightly in the regions adjacent the more conducting zones of the photoconductive medium.

This regionally higher emission is maintained even after the projected image has been removed, by the feedback action of the luminescence of the first slab to the photoconductive medium. The inner slab and photoconductive medium are shielded from all ambient light by the opaque layer.

The outer electroluminescent slab emits light in the same places that the inner slab emits. Hence, an image corresponding to the one projected appears on its surface and is viewed. Since the intervening layer optically isolates the viewed slab from the remainder of the device, the light intensity in the viewed slab has no influence on the driving photoconductive layer. Accordingly, the outer slab may be viewed either in room light or in darkness.

The invention and its further objects, features and advantages will be readily discerned in detail from a reading of the description to follow of an illustrative embodiment.

DETAILED DESCRIPTION OF ILLUSTRATIVE EMBODIMENT

Structure

Figure 1:
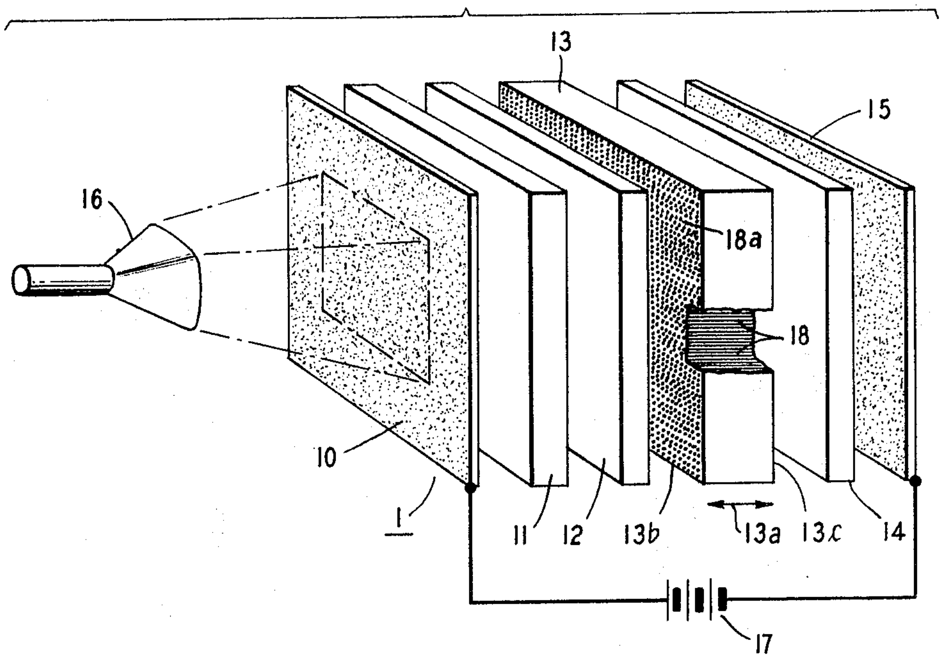
FIG. 1 is an exploded schematic perspective diagram showing the assembly of an image-retaining panel constructed pursuant to the invention.

In broad terms, the image-retaining panel designated 1, may be viewed as a succession of contiguous layers as depicted in FIG. 1. A transparent electrode 10 is disposed adjacent to a photoconductive medium 11. Contacting medium 11 is an inner electroluminescent slab 12; and adjacent the latter is an optically opaque layer 13 which conducts electrically only widthwise as indicated by the arrow 13*a*, and is otherwise electrically insulative. Contacting the output side of slab 13 is an outer electroluminescent layer 14, which in turn is contacted by a second transparent electrode 15. A steady potential as from battery 17 of, for example, 100 volts is applied between the electrodes 10 and 15.

The electrodes 10 and 15 are constructed of gold or tin oxide evaporated onto a transparent sheet of glass or plastic.

The photoconductive medium 11 is made from a material such as cadmium sulfide. Electroluminescent layers 12 and 14 consist of material such as zinc sulfide.

Figure 2:
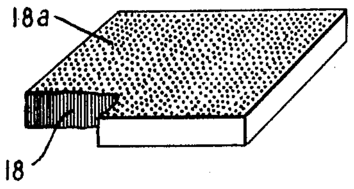
FIG. 2 is a front perspective view of a first embodiment of an intermediate slab.
Figure 3:
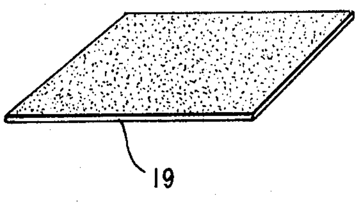
FIG. 3 is a front perspective view of a second embodiment of said slab.

Slab 12 is shown in detail in one embodiment in FIG. 2, as consisting of an array of intimately spaced parallel fine wires 18 embedded in an opaque, electrically insulative material such as opaque glass, for example. The ends 18*a* shown in FIGS. 1 and 2 are coterminous with the surfaces 13*b*, 13*c* of the slab 13. Alternatively, as shown in FIG. 3, the opaque slab 13 may consist of a thin sheet of evaporated metal 19, so chosen that the electrical resistance in the direction through the sheet is small though the electrical resistance in the direction through the sheet is small though the electrical resistance in the lateral dimensions is large—e.g., evaporated chromium a few thousand Angstroms thick.

Operation

An image from projector 16 is projected onto transparent electrode 10. In response, the photoconductive medium 11 becomes electrically conductive across its width, by an amount dependent upon the local brightness of the image. By virtue of the connection between electrodes 10 and 15, a current commences to flow in photoconductive medium 11, in the conducting regions thereof.

This current flow reaches electroluminescent slab 12, which luminesces locally to produce a first replica of the projected image. The local luminescence of slab 12 now serves as the source of photo energy for maintaining the local electrical conductivity in medium 11 that was originally created by the now-discontinued image from projector 16.

Associated with the luminescing layer 12 are regions of varying electrical conductivity dependent upon the intensity of the local luminescing. The potential applied between electrodes 10 and 15 finds conductive paths of locally varying resistance through electroluminescent layer 12. Pursuant to the invention, this local current density pattern is transmitted through the laterally conducting slab 13 by, for example, the myriad of individual wires 18. Then, in transversing the second electroluminescent layer 14, this local current reproduces in layer 14 luminescence in the form of a second replica of the originally projected image. This image may be viewed through the second transparent electrode 15.

None of the light from luminescent layer 14 can pass back through the opaque layer 13, and so neither ambient light falling on layer 14 nor the light it itself emits can affect the operation of the device.

Figure 4:
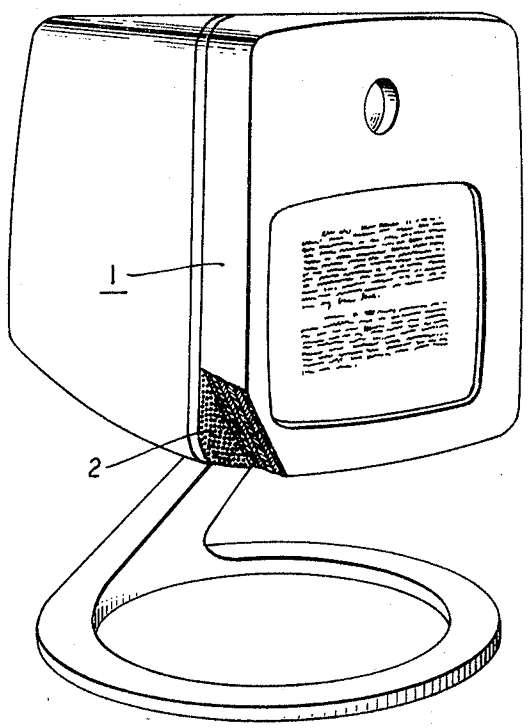
FIG. 4 is a frontal perspective view of the inventive image-retaining panel in association with a video telephone screen.

FIG. 4 depicts the image-retaining panel in association with a video screen. In a manner not shown, the panel 1 could be placed at some distance from the video screen; and in that case would have an image of the video screen projected upon it with a lens in a normal manner. Alternatively the panel could be placed in direct contact with the outside surface 2 of the video screen.

The front wall of the video screen should, in this case, be made as a fiber optic faceplate so that the image originally on the phosphor inside the video tube is conveyed without loss of resolution to the input surface of the image retaining panel. The attachment is advantageously temporary to permit standard use of the video system. No light screen is necessary. The panel may be viewed in room light with good contrast giving a high resolution image that lasts for minutes without reenergizing. Use of the panel furthermore frees the transmitting channel for other message tasks.

It is to be understood that the embodiments described herein are merely illustrative of the principles of the invention. Various modifications may be made thereto by persons skilled in the art without departing from the spirit and scope of the invention.

What is claimed is:

1. An image-retaining panel comprising a photoconductive medium and an adjacent electroluminescent slab, a second electroluminescent slab and an intervening layer electrically connecting and optically isolating said first and second slabs, said layer being electrically conductive in a direction normal to the adjacent faces of said two slabs, and electrically nonconducting substantially in all other directions, and first and second transparent electrodes disposed respectively upon the exterior side of said photoconductive medium and the exterior side of said second electroluminescent slab.

2. A device in accordance with claim 1 wherein said layer comprises a plurality of fine, intimately spaced, unconnected metallic wires disposed in an optically opaque, electrically insulating material, the ends of said wires being coterminous with the two opposing surfaces of said layer.

3. The panel of claim 1, in combination with a video screen and means optically connecting said photoconductive medium and said screen.

4. The apparatus of claim 3 wherein said means comprises an optical fiber front wall in said screen.

5. A panel pursuant to claim 1, further comprising a voltage source connected between said first and second electrodes.

* * * * *